(12) United States Patent
De Groot et al.

(10) Patent No.: US 7,226,244 B1
(45) Date of Patent: Jun. 5, 2007

(54) SYSTEM FOR OVERLOAD PROTECTION FOR PIPE OR CABLE LAYING STRUCTURES

(75) Inventors: Anne Klaas De Groot, Odijk (NL); Joop Roodenburg, Delft (NL)

(73) Assignee: Itrec B.V., Schiedam (NL)

( * ) Notice: Subject to any disclaimer, the term of this patent is extended or adjusted under 35 U.S.C. 154(b) by 0 days.

(21) Appl. No.: 10/223,191

(22) Filed: Aug. 19, 2002

(51) Int. Cl.
*F16L 1/19* (2006.01)
*F16L 1/23* (2006.01)
*F16L 1/235* (2006.01)

(52) U.S. Cl. .............. 405/168.4; 405/166; 405/168.3
(58) Field of Classification Search ............... 405/158, 405/166, 168.1, 168.3, 168.4
See application file for complete search history.

(56) References Cited

U.S. PATENT DOCUMENTS

| | | | | |
|---|---|---|---|---|
| 3,685,306 A | * | 8/1972 | Mott | 405/168.3 |
| 3,739,971 A | * | 6/1973 | Silvestri et al. | 405/168.4 |
| 3,982,402 A | * | 9/1976 | Lang et al. | 405/168.3 |
| 5,893,682 A | * | 4/1999 | Oliveri | 405/166 |
| 5,975,802 A | * | 11/1999 | Willis | 405/166 |
| 6,551,027 B2 | * | 4/2003 | Willis et al. | 405/158 |

FOREIGN PATENT DOCUMENTS

| WO | WO 96/35902 | 11/1996 |
|---|---|---|
| WO | WO 01/38768 A1 | 5/2001 |

\* cited by examiner

*Primary Examiner*—Michael Safavi
(74) *Attorney, Agent, or Firm*—Buskop Law Group, PC; Wendy Buskop

(57) ABSTRACT

The invention is vessel with a tower adapted to be inclined for handling of tubulars mad of a vessel, a tower with a mast that can be inclined, a pipe reel for storing passing tubulars, a strut with a sleeve for engaging and enabling tower inclination, and a tensioner mounted moveably on the mast for receiving the tubular wherein the tensioner is made of two connectors connected to the mast, a frame that engages the connectors, two track bodies that engage the tensioner frame and the tubular, and an adjustable vertical support adapted to modify the relationship between the force transmitted by the adjustable vertical support onto the tensioner and the motion of the tensioner relative to the mast.

17 Claims, 16 Drawing Sheets

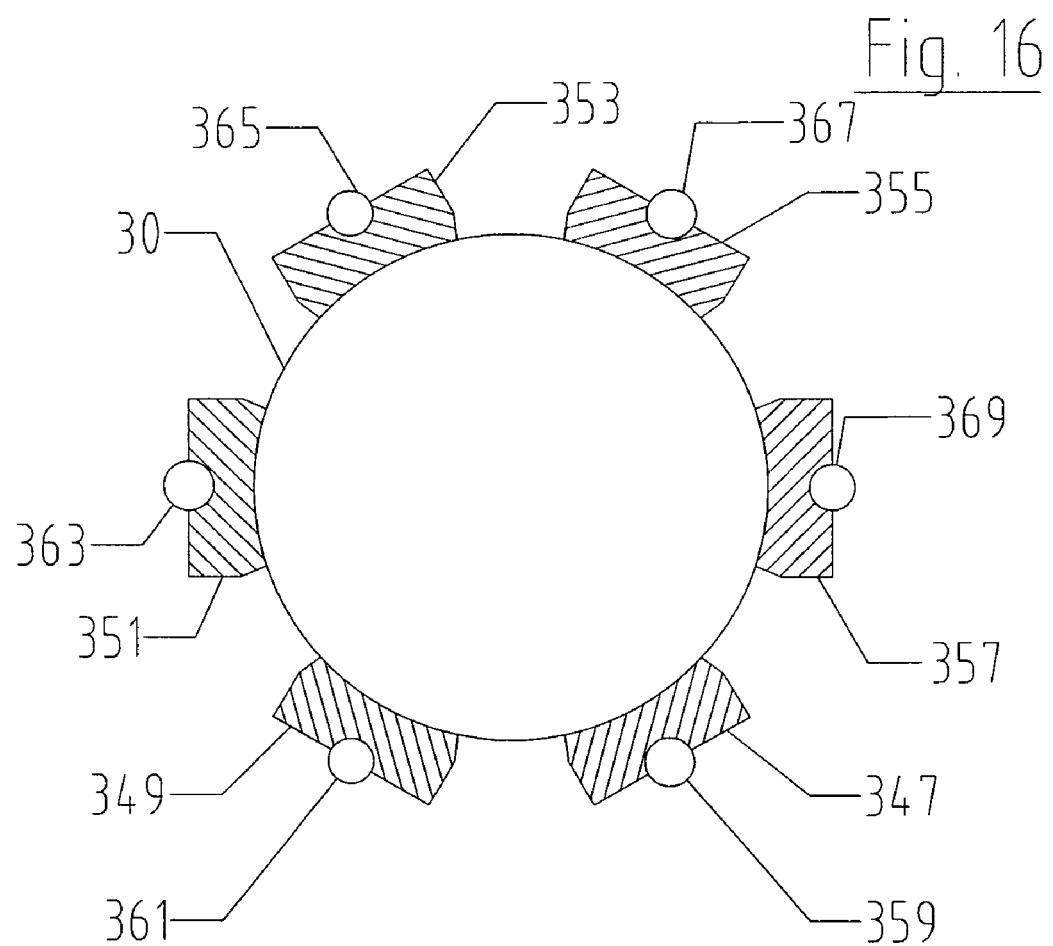

SYSTEM FOR OVERLOAD PROTECTION FOR PIPE OR CABLE LAYING STRUCTURES

FIELD OF THE INVENTION

This invention relates to a system and device protection for tubular laying, such as cable or pipe laying on board a vessel or from production platform using a tower and a adjustable tensioner and an emergency braking system.

BACKGROUND OF THE INVENTION

This invention relates to a pipe lay vessel with a reel for carrying a length of pipe and first drive motor for controlling rotation of the reel, a substantially vertical tower comprising at its upper end a radius controller for deflecting the pipe from a first trajectory extending between the reel and the radius controller to a second substantially vertical trajectory and an adjustable tensioner for carrying the vertical pipe section having drive motors for feeding the pipe along the vertical trajectory. Such a vessel is known from WO-96/35902 in which a pipe is spooled from a storage reel to a bending shoe mounted on a derrick structure that is situated above a moon pool. The vertical pipe section is passed via a 3-point straightening assembly into the water. The known J-lay vessel is particularly suitable for laying pipe in deep water. It is known to suspend the vertical pipe section from a clamping device or tensioner, which can be driven or braked to feed the vertical pipe section towards the seabed. The reel supplying the pipe is also driven or braked in a controlled manner. Variations in pipe speed along the first trajectory between the reel and the radius controller will occur because the pipe coming from the reel will have varying speed, even at constant reel rotation since the pipe is not always evenly spooled on the reel and the diameter of the unspooled pipe on the reel varies during the unspooling process. Also during start-up and stopping and during emergency crash-stop situations speed variations of the pipe will occur along the first trajectory and along the vertical trajectory where the pipe is fed through the tensioner. Speed variations may also be caused by plasticity of the pipe and partial straightening upon unspooling. Because of the varying tension along the first trajectory between the reel and the radius controller sagging of the pipe or overload of structural elements that guide the pipe may occur. Another problem that can occur during laying of pipe is a failure of the tensioner to hold the pipe resulting in an overload of structural elements that guide the pipe, eventually a complete loss of the pipe or in the worst case even loss of human lives. Especially dangerous is the situation where the pipe moves uncontrolled with high speed to the seabed causing unacceptable loads to the supporting structure. Different sizes of pipe can be installed on the seabed by the same vessel. For each size of pipe the tensioner has to provide enough holding force to hold the pipe without damaging the pipe. In current systems changing from one pipe size to another involves a change of the holding shoes of the tensioner. This is a time consuming process with severe consequences if not performed adequately.

It is therefore an object of the present invention to provide a pipe lay system with which tension of the pipe along the first trajectory can be maintained substantially constant regardless of any differences in pipe speed between the tensioner and the reel.

It is a further object of this invention to provide a tensioner system, which can hold several diameters of pipe without the need to change the holding shoes and still provide enough holding force.

Again it is a further object of this invention to provide a system, which precisely aligns the tensioner and holding shoes around the pipe to avoid damage to the pipe and to provide an adequate holding force under all circumstances.

Again it is a further object of the present invention to provide a braking device to hold the pipe when the tensioner has failed to hold the pipe when the pipe moves at low speeds. It is a further object of this invention to provide a braking system, which is capable of braking and holding a fast moving pipe.

Thereto the pipe lay system of the present invention is characterized in that a movable tensioner is provided for lengthening of shortening the first pipe trajectory to maintain a substantially constant tension of the pipe along the first trajectory during unwinding of the reel. The tensioner is provided with a separate braking system to hold the pipe when the tensioner fails. The tensioner of the present invention is provided with a passive aligning system to align the track bodies and holding shoes in the most optimal position for a given pipe diameter. Thus ensuring that always the maximum holding force is generated.

By displacing the tensioner, the first pipe trajectory can be lengthened or shortened to compensate for variations in speed due to non-uniform winding of the pipe and varying diameter of the spooled pipe. As result the tension in the pipe along the first trajectory (the back tension), can be made substantially constant.

In one embodiment of the pipe lay system according to the present invention, a detector is placed near the tensioner for measuring its position relative to a normal working position. A control unit receives position signals from the detector and supplies a control signal to the drive motors of the reel and/or to drive motors of the tensioner for changing the pipe laying speed such that the tensioner is at least substantially returned to its normal position. The tensioner is supported by an adjustable support, which can be adjusted to maintain a certain value of back tension and makes it possible for the tensioner to move. In normal operation the rod of the adjustable support rests on a support mounted on the tower and the tensioner remains stationary. In this way any increase in the downward forces is not transmitted to the pipe section between the reel and the tensioner and cannot influence the back tension. Only when the tension in the pipe section between the reel and the radius controller becomes larger than a pre-set value of the adjustable support, the tensioner will move such that the first trajectory is shortened causing the back tension to remain at a constant value. When this is the case the control unit may either increase the unwind speed of the reel, such that the tensioner is moved back to its equilibrium position on the tower or may decrease the speed at which the pipe is fed along the vertical section. In both cases the tension in the pipe section between the reel and the radius controller will remain at a constant value.

Detecting the position of the tension compensator may be carried out optically of by encoders measuring a hinge angle of the tensioner or, in another embodiment, by measuring the vertical displacement of the tensioner.

By engaging the braking system on the pipe the pipe can be held stationary until the tensioner can hold the pipe again. In one embodiment of the braking device according to the present invention the braking system consists of two (or more) rollers, which engage a moving pipe with such force that the pipe plastically deforms and the outer diameter of the pipe decreases. The deformation of the pipe will cause the moving pipe (which has to provide the energy for the deformation) to stop. An advantage of the roller system is that the pipe can be stopped even when the pipe is moving at high speeds without excessive forces on the braking mechanism or the supporting structure. In another embodiment of the braking device the rollers are replaced with a self-locking braking pads. The braking pads are of such design that the braking force increases with the weight of the length of pipe that needs to be supported but does not exceed a braking force which causes damage to the supporting structure.

SUMMARY OF THE INVENTION

The invention is a vessel with a tower adapted to be inclined for handling of tubulars made of a vessel, a tower with a mast that can be inclined, a pipe reel mounted on the vessel for storing a tubular and passing the tubular to the radius controller, and a tensioner mounted moveably on the mast for receiving the tubular from the radius controller. The tensioner is made of two connectors, a tensioner frame, two track bodies that engage the tensioner frame and the tubular, and a strut for engaging and enabling tower inclination. The tensioner also has an adjustable vertical support adapted to modify the relationship between the force transmitted by the adjustable vertical support onto the tensioner and the motion of the tensioner relative to the mast.

The invention is also a tensioner mounted removably on a tower adapted to be inclined for handling tubulars. The tensioner is made of two connectors, a tensioner frame, two track bodies that engage the tensioner frame and the tubular, and a strut for engaging and enabling tower inclination. The tensioner also has an adjustable vertical support adapted to modify the relationship between the force transmitted by the adjustable vertical support onto the tensioner and the motion of the tensioner relative to the mast The invention is also a tensioner mounted removably on a tower adapted to be inclined for handling tubulars. The tower is made of two flanges, a frame adapted to be inclined, two track bodies that engage the frame and the tubulars, and an adjustable vertical support frame adapted to modify the relationship between the force transmitted by the adjustable vertical support onto the tensioner and the motion of the tensioner relative to the tower.

The invention is also a tubular braking device mounted on tensioner frame that includes a plurality of braking pads and a braking housing.

BRIEF DESCRIPTION OF THE DRAWINGS

A specific embodiment of the invention will be described by way of example with reference to the accompanying drawings, in which:

FIG. 16 is a cutaway view of a tubular with clamp shoes surrounding the tubular.

DETAILED DESCRIPTION OF THE INVENTION

Figure 1:
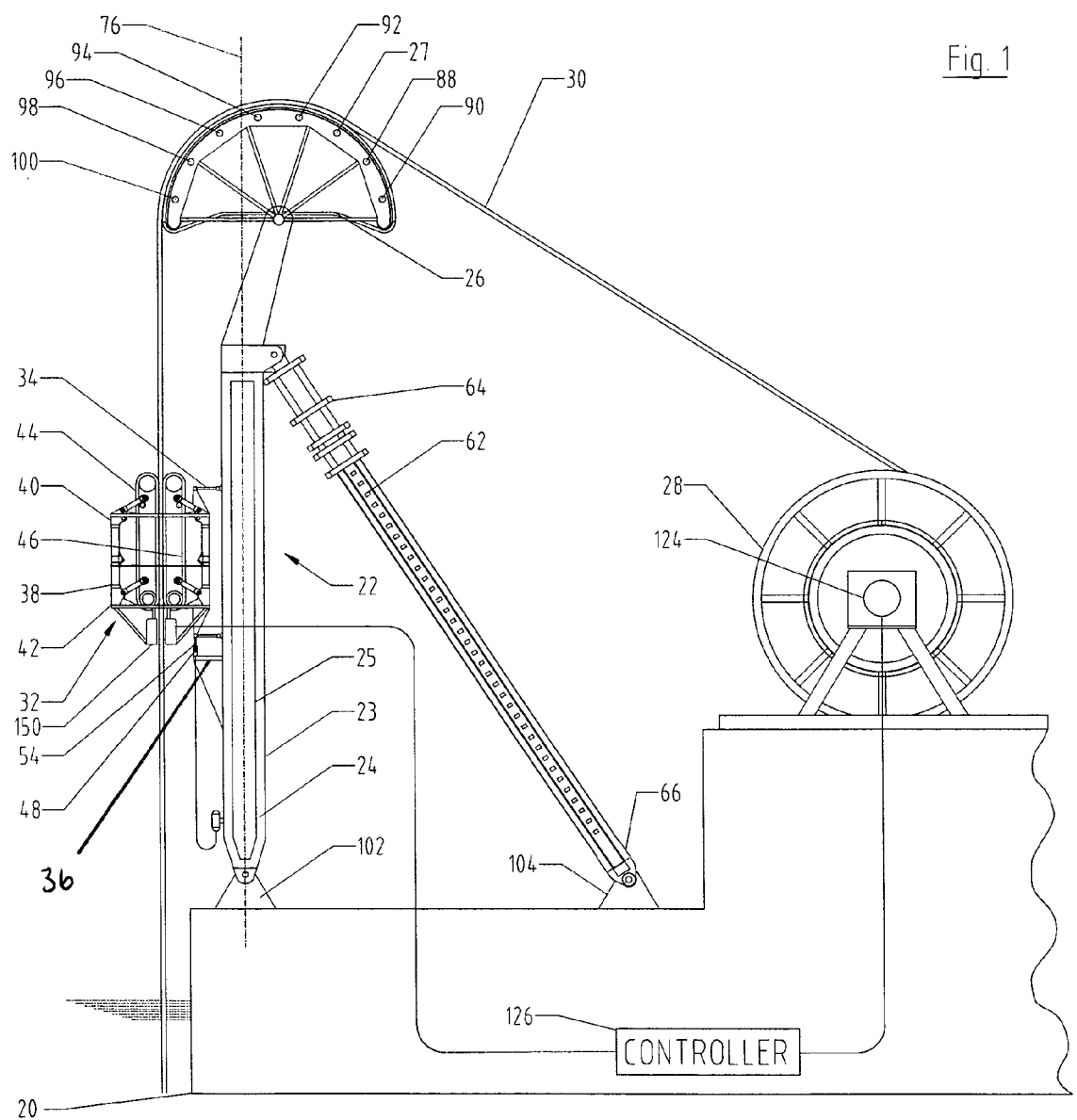
FIG. 1 is a side view of a tensioner on a tower.

The present invention is further described with reference to the Figures,

As shown in FIG. 1, vessel (20) has a tower (22). The tower (22) is adapted to be inclined for the handling of tubulars. The tower (22) is constructed of a mast (24). This mast (24) is connected to the vessel and the tower such that it can be inclined. The mast (24) further is preferably hollow, such as a hollow tube, wherein the mast has a mast exterior (23) and a mast interior (25) and a radius controller (26). The radius controller is preferably removably mounted to the mast. It should be noted that the mast could be solid and still function within the scope of the invention. It is contemplated that the mast of the tower can be inclined or reoriented between 0 and 90 degrees from the initial vertical axis (76) of the tower.

The radius controller (26) consists of at least one anti-frictional device, like a roller. It can be a pipe lay ramp comprising at least one roller or between 1 and 50 rollers. The roller embodiment is shown on a ramp wherein the rollers are reference numerals (27), (88), (90), (92), (94), (96), (98) and (100).

Figure 8:
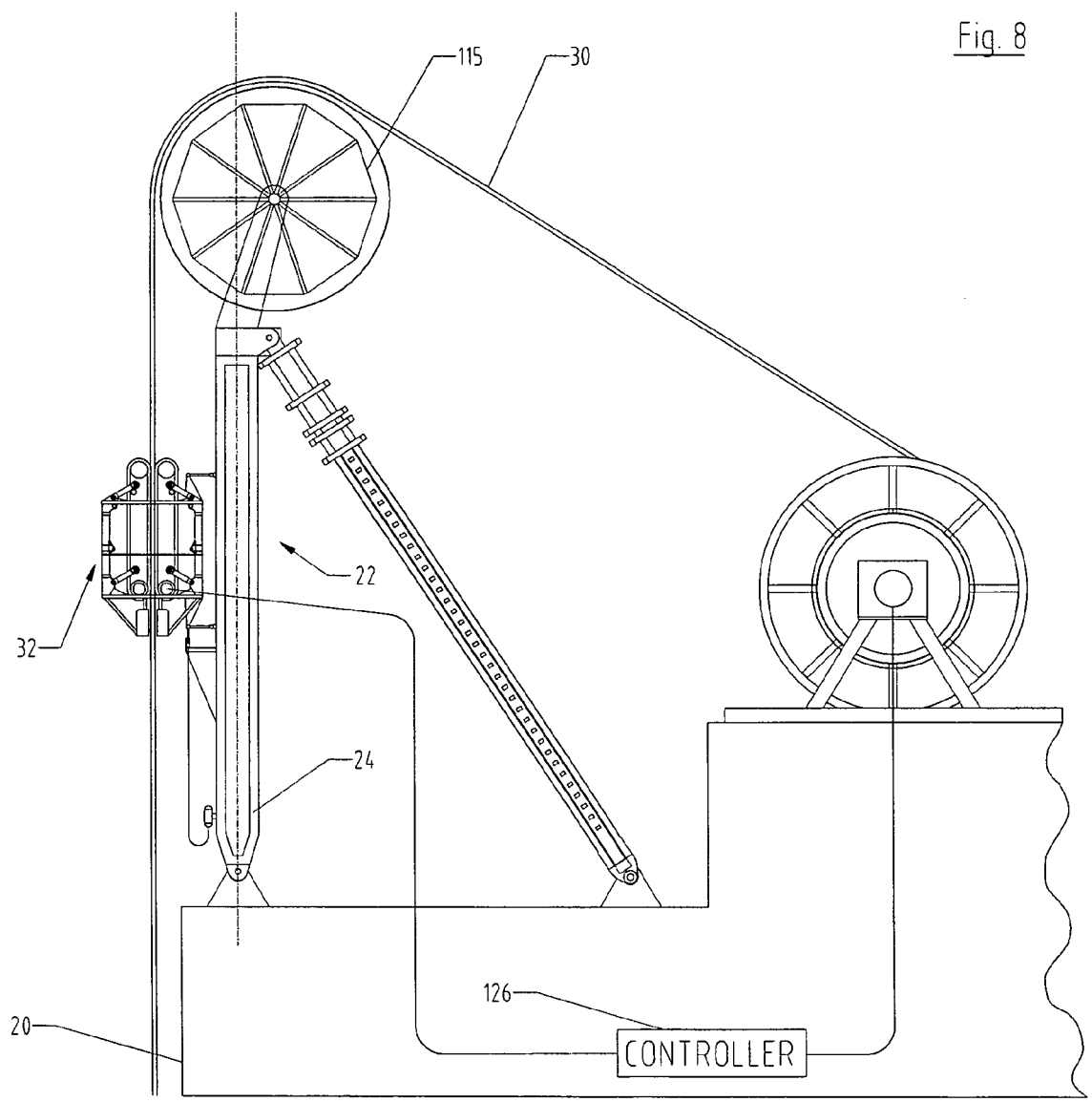
FIG. 8 is a side view of a second embodiment of a vessel with the second embodiment of the radius controller.

In still another embodiment, the radius controller is a wheel (115), as shown in FIG. 8 connected to the mast. The wheel receives the tubular (30) and passes the tubular to the tensioner (32).

A pipe reel (28) is mounted to the vessel (20). This pipe reel is used for storing tubular (30) and for passing a tubular (30) to the radius controller. The pipe reel (28) in FIG. 1 passes the tubular (30) to the rollers on the ramp.

A tensioner (32) is mounted removably on a tower (22) adapted to be inclined for handling tubulars. The tensioner (32) is mounted moveably on the mast (24) for receiving the tubular (30) from the radius controller. This tensioner has a first connector (34) that is connected to the mast exterior (23) on one end and the tensioner (32) on the other end, and a second connector connects (36) to the mast exterior (23) on one end and the tensioner on the other end.

Figure 3:
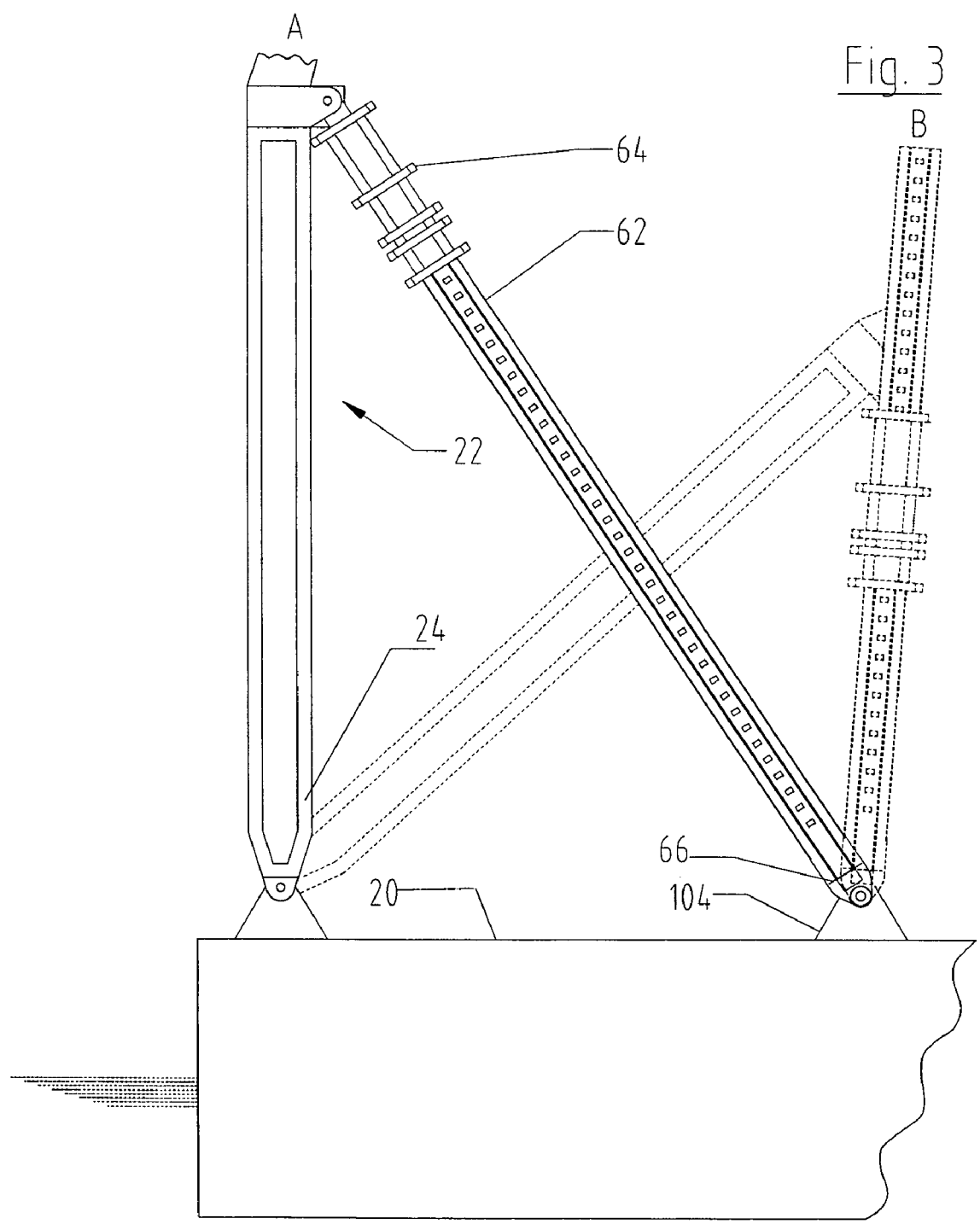
FIG. 3 is a detailed view of a strut used in the invention showing two different positions of the tower.

FIG. 1 also shows the mast connected to the vessel using a first rotatable base (102). The second strut end (66) of the strut (62) is connected to the vessel using a second rotatable base (104), which is also shown in FIG. 3. A sleeve (64) is shown holding the strut (62).

It should be noted that motors could operate the track bodies and the pipe reels. One of the motors is shown in FIG.

Figure 4:
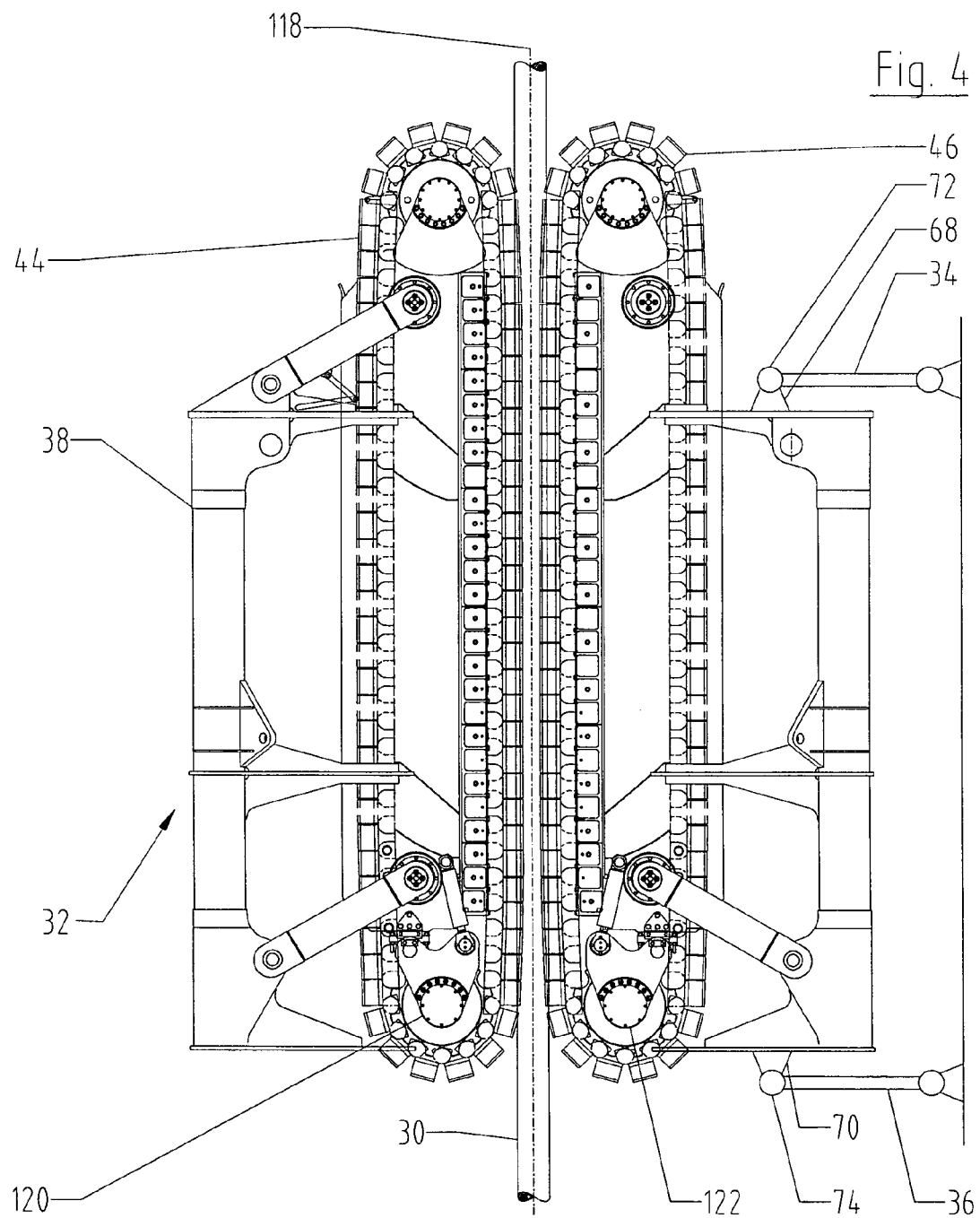
FIG. 4 is a hinged embodiment of the invention showing two track bodies.

1 as motor (124). FIG. 4 shows the additional two motors (120), (122). A controller (126) connects these three motors and controls their operation.

FIG. 1 also shows a tower (22) having a tensioner mounted to it, where the tensioner (32) consists of a tensioner frame (38) disposed on exterior of the mast. The tensioner frame has a top portion (40) and a bottom portion (42). The first connector engages the top portion and the second connector engages the bottom portion. In one embodiment, the first and second connectors are hinges. The tubular braking device (150) is shown as part of the tensioner for control.

The track bodies are secured to or disposed in the tensioner frame (38). In the most preferred embodiment, the first (44) and second (46) track bodies are in an opposing relationship with each other. The first track body engages the tensioner frame and the tubular, and the second track body engages the tensioner frame and the tubular.

An adjustable vertical support (48) connects to a rod (54) and to the tensioner frame and is adapted to modify the relationship between the force transmitted by the adjustable vertical support onto the tensioner and the motion of the tensioner relative to the mast.

Figure 2:
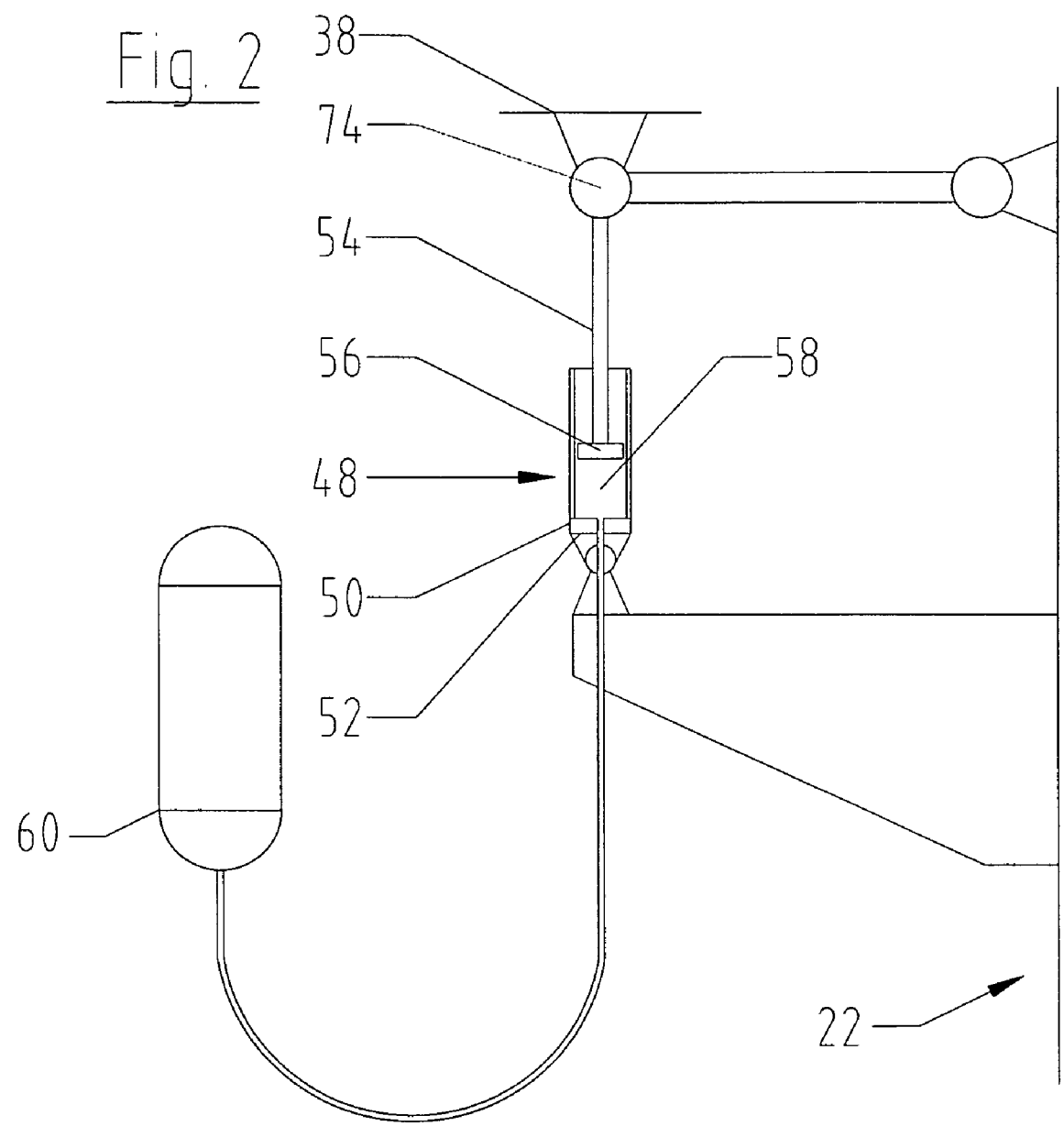
FIG. 2 is a detailed view of an accumulator attached to a cylinder as used in the in invention.

FIG. 2 shows a detailed view of an adjustable vertical support (48), which is made up of a housing (50). This housing has a first end (52) connected to the mast. The vertical support further comprises a rod (54) connected to a bearing (74) on one end and a piston (56) on the other end. The rod (54) can slide in the housing. The bearing is (74) is connected to the tensioner frame (38). The piston slidably compresses fluid into an adjoining a chamber (58). The chamber (58) is connected to an accumulator (60), such as through a conduit or hose. In another embodiment, the adjustable vertical support is a mechanical spring. The accumulator (60) and the chamber (58) can be fluidly connected with gas, air, nitrogen, an inert liquid or mixtures thereof. The inert liquid can be oil, hydraulic fluid, water, and liquids that are biodegradable. In normal operation piston (56) rests on housing first end (52) and all vertical downward forces on the tensioner will be transferred directly to the mast. Only when the added back tension and compressed fluid forces are larger than the downward force generated by the weight of the pipe and other influences will the tensioner move upward. The possibility of the upward movement ensures that the combined fluid forces and back tension forces remain at a pre-set value. The tensioner will move upward until the back tension forces are decreased such that equilibrium is reached again with the downward forces. In this way the back tension can never increase above values that would cause damage to the system. Provided that the tensioner has not reached its end positions. The presence of adjustable fluid forces makes it possible to select a certain back tension force at which the tensioner will move upward. This is a great advantage because different sizes of pipe or different materials of pipe each need a different optimal value of back tension. Limiting the back tension forces increases safety on board because no overloading can take place anymore. Overload alarms and extra repairs and/or maintenance giving an economical advantage do not interrupt the pipe-laying process anymore. In the present invention the fluid forces can be varied continuously to compensate for the varying weight of pipe after the tensioner. The fluid force controller can use the position of the tensioner and optionally a sensor that measures the load on the tensioner caused by the weight of the pipe after the tensioner to set the fluid forces to an optimal value. In conjunction to this the main controller of the tensioner and reel system can also use the position of the tensioner and the setting of the fluid forces to control the pipe-laying process.

It is contemplated that between 1 and 4 adjustable vertical supports per tensioner can be used in this invention. The adjustable vertical supports can be hydraulically operated, pneumatic or another similar means, including a spring.

FIG. 3 provides a detail on the strut. Strut (62) connects to the tower at one end and to the vessel (20) at the other end. The strut has a sleeve (64) disposed around the strut for slidably enabling the tower (22) or mast (24) to be inclined. The end of the strut that engages the vessel is strut end (66). Strut end (66) connects to the second rotatable base (104). FIG. 3 shows two possible positions of the tower (22) denoted by position A and position B.

FIG. 4 shows the tubular (30) of the axis tensioner (118) passing between the track bodies (44) and (46) of the tensioner (32). Connection tensioner frame (38) is attached to the tower with connectors (34) and (36) in a preferred embodiment. First connector (34) has first base (68) for engaging the tensioner frame. Second connector (36) has a second base (70) for engaging the tensioner frame (38). The first base (68) preferably has at least one bearing (72) for engaging the first connector. The second base has at least one bearing (74) for engaging the second connector. Motors run each the track bodies. Track body (46) is driven by motor (122) and track body (44) is driven by motor (120).

The tensioner frame disposed outside the tower adapted to be inclined can be connected to the mast at the top portion, such as on the topside of the frame, or at the very top of the frame. Preferably, the frame has six sides, topside, a left side, a right side and a bottom side, a front and a back. It is contemplated that the tensioner frame is connected on either the topside or the top of the left or right sides, or the top of the front or back. Similarly, it is contemplated that the bottom portion is connected on the bottom, or the bottom portion of the left side, or the bottom portion of the right side, or the bottom portion of the front or back. So long as the connectors are located on the same side, to keep the frame parallel to the mast, the tensioner can be effectively mounted.

Figure 5:
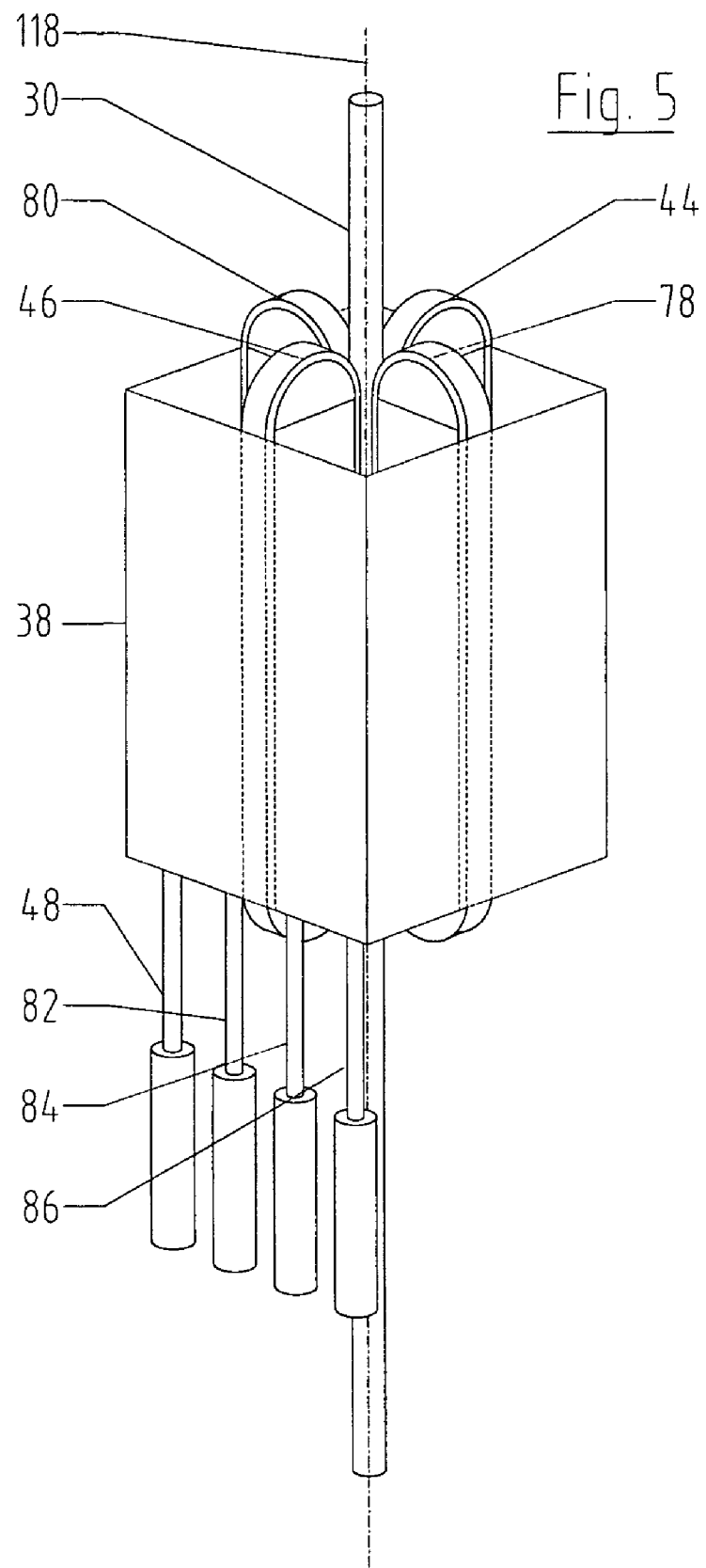
FIG. 5 is a perspective view of a tensioner according to the invention, having four adjustable supports and 4 track bodies.

FIG. 5 shows that a tubular (30) passing through a tensioner having four track bodies contained within the frame (38), first track body (44), second track body (46) third track body (78) and fourth track body (80). The invention can be used with only 2 track bodies, but is contemplated that between 2 and 4 track bodies can engage the tubular. Secured to the tensioner frame (38) are adjustable vertical supports in this FIG. 5, the adjustable vertical supports appear as (48), (82), (84) and (88).

Figure 6:
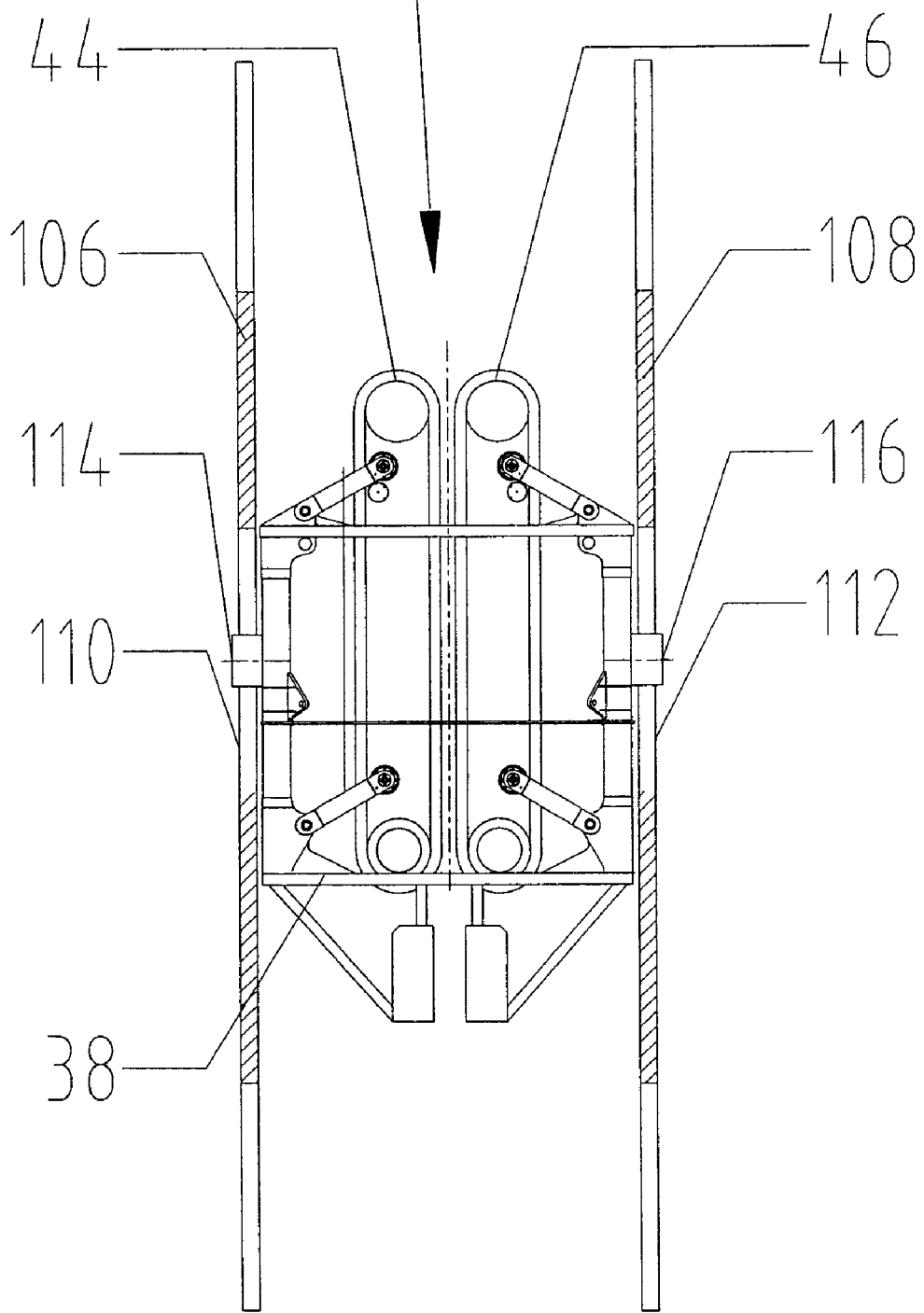
FIG. 6 is a front view of a second embodiment of tensioner as connected to the tower.

FIG. 6 shows a cut away view of another embodiment of the connecting tensioner (38) on the tower. In this view tensioner (32) comprises the tensioner frame (38), first track body (44), second track body (46) first flange (106), and second flange (108). FIG. 6 also shows the first flange (106) having a first slot (110) and second flange (108) having a second slot (112). The first axle (114) and second axle (116) are also shown on the connecting tensioner (38).

It should be noted that the tensioner has a tensioner vertical axis (118) shown in FIG. 5. In another preferred embodiment, the tower vertical axis and the tensioner vertical axis are parallel to each other.

Figure 7:
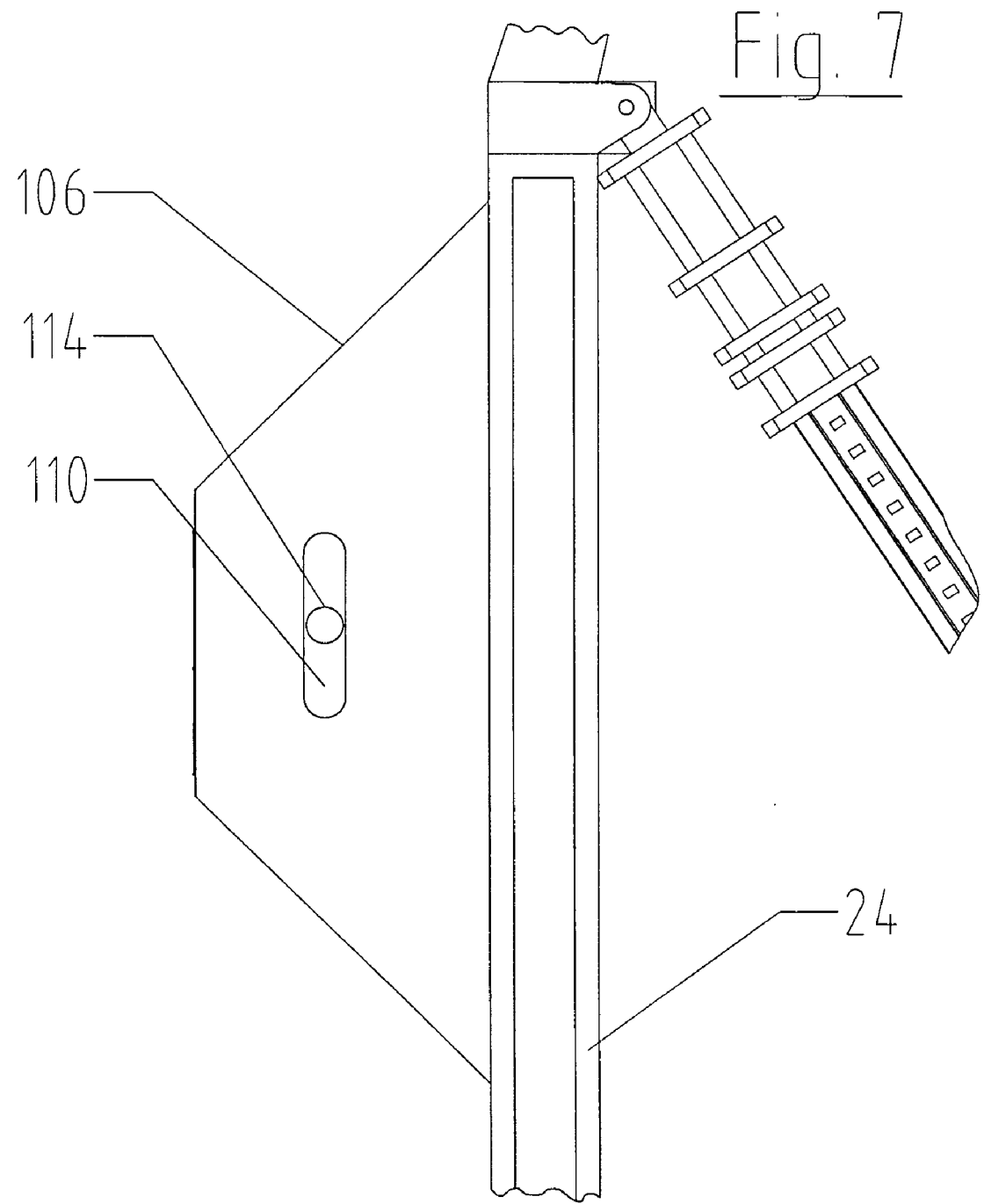
FIG. 7 is a side view of the embodiment of FIG. 6.

FIG. 7 is a side view of the flange and slot arrangement of FIG. 6. In particular, in this view the mast (24) is shown with the first flange (106) having a first axle (114) for engaging the first slot (110) of the tensioner. Similarly, a second axel (116) shown in FIG. 6, engages the second flange's second slot (112). The flange and slot arrangement has the particular advantage that the movement is parallel to the mast compared to a trapezium movement of the tensioner when the tensioner is connected to the mast with hinges.

As noted in FIG. 4, a first motor (120) can be connected to the first track body and a second motor (122) connected to the second track body for driving the respective track bodies. As noted in FIG. 1, a third motor (124) can connect to pipe reel (28) for rotating the pipe reel. A controller (126) can connect the first, second, and third motors for controlling motor speed, start and stop.

FIG. 8 is a larger side view of the tensioner (32) as mounted on a tower (22) on a vessel (20) wherein the motors of the tensioner are connected to the controller (126), which also controls the motor of the pipe reel, which is sending the tubulars (30) to a wheel (115) that acts as the radius controller. The tower (22) or mast (24) that is moved slidably to be inclined is also shown in the figure.

Figure 9:
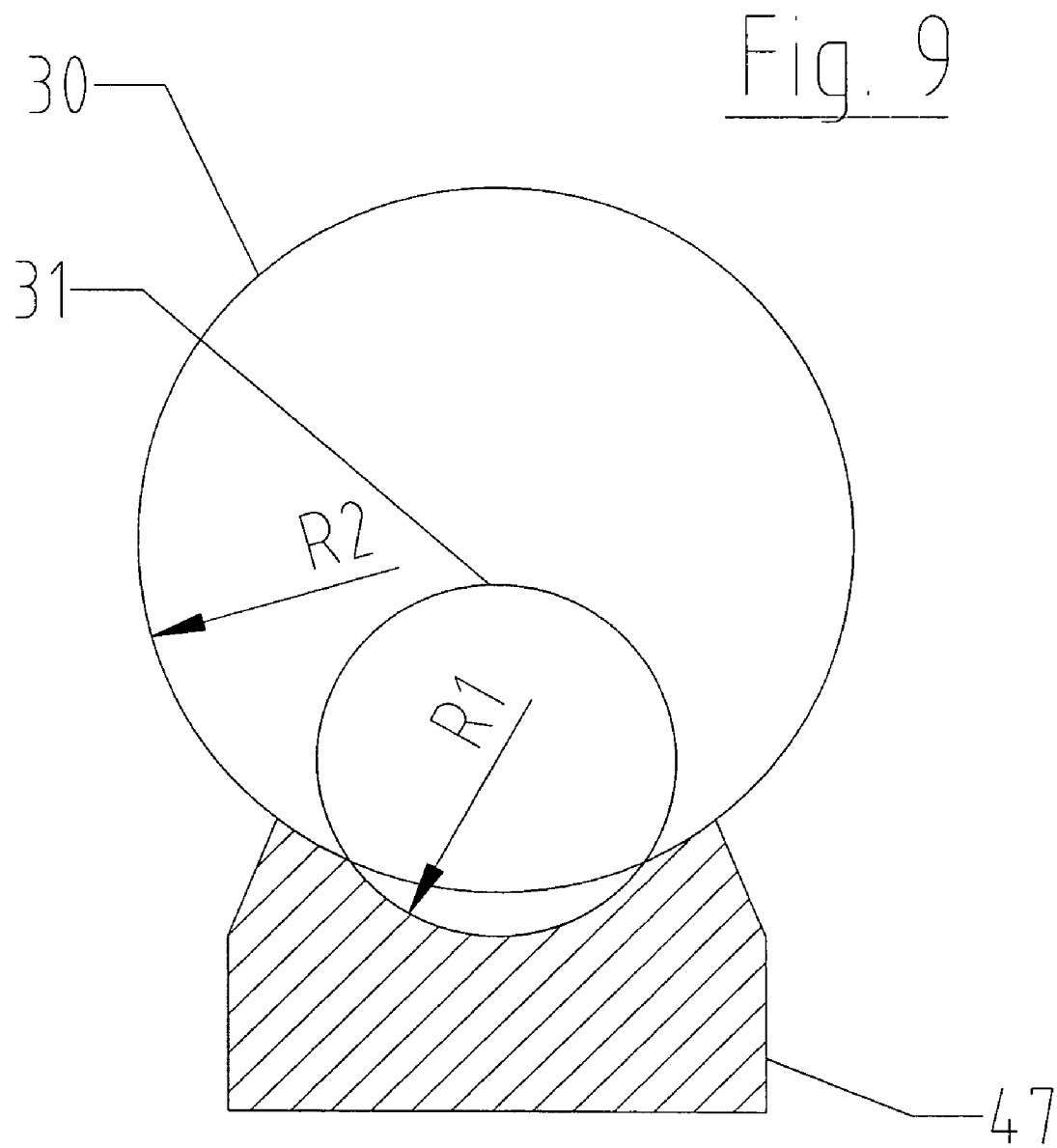
FIG. 9 is a cross sectional view of a tubular over a clamping shoe showing the position of two different pipe diameters on the clamping shoe.

FIG. 9 is a detail of a tubular (30) as engaging a first clamping shoe (47) that can be used on the tensioner tracks. As can be seen one clamping shoe can handle two different sizes of tubulars. Large tubular 30 with radius R2 and Small tubular 31 with radius R1. When changing the size of the tubular the clamping shoes do not have to be changed to accommodate for the change in radius. FIG. 9 shows that one clamping shoe can handle two different sizes of tubulars, large tubular (30) with radius R1 and small tubular (31) with radius R2. The advantage of this design is that when changing the size of the tubular, the clamping shoes do not have to be changed to accommodate for the change in radius. This embodiment saves time and reduces the need for numerous different clamping shoes.

Figure 10:
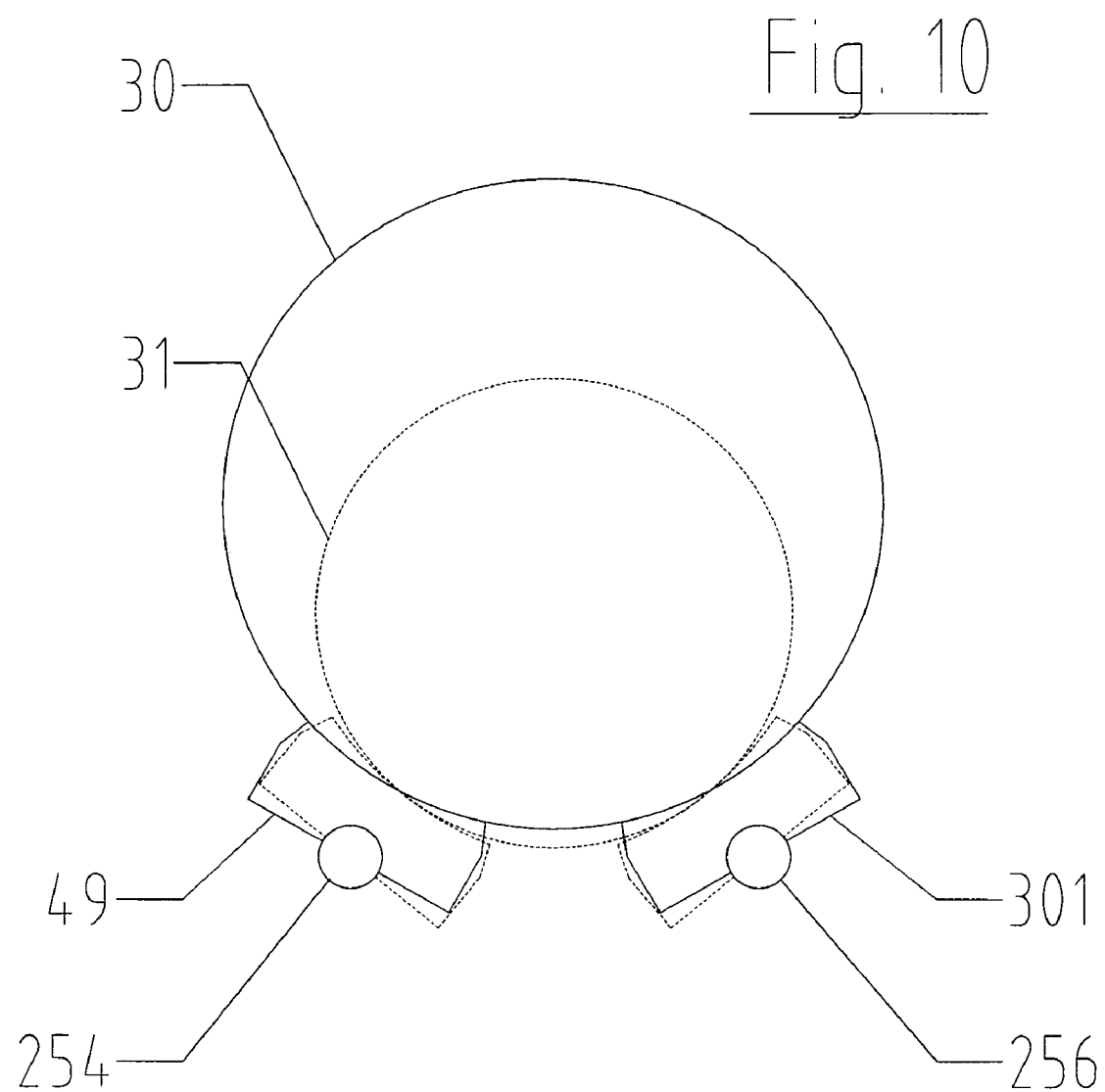
FIG. 10 is second embodiment a clamping shoe arrangement showing the position of two different pipe diameters.

FIG. 10 is a detail of a tubular (30) as being held by a third clamping shoe (49) and a second clamping shoe (301). In a preferred embodiment, each clamping shoe has a shoe bearing enabling it to rotate. In this FIG, shoe (49) has bearing (254) and shoe (301) has bearing (256). The shoes automatically take a correct position when different sizes of tubulars are handled. FIG. 10 shows the different positions of the clamping shoe (49) and clamping shoe (301) when large tubular (30) and small tubular (31) are handled. FIG. 10 shows the position of the clamping shoes with a small tubular and a large tubular.

Figure 11:
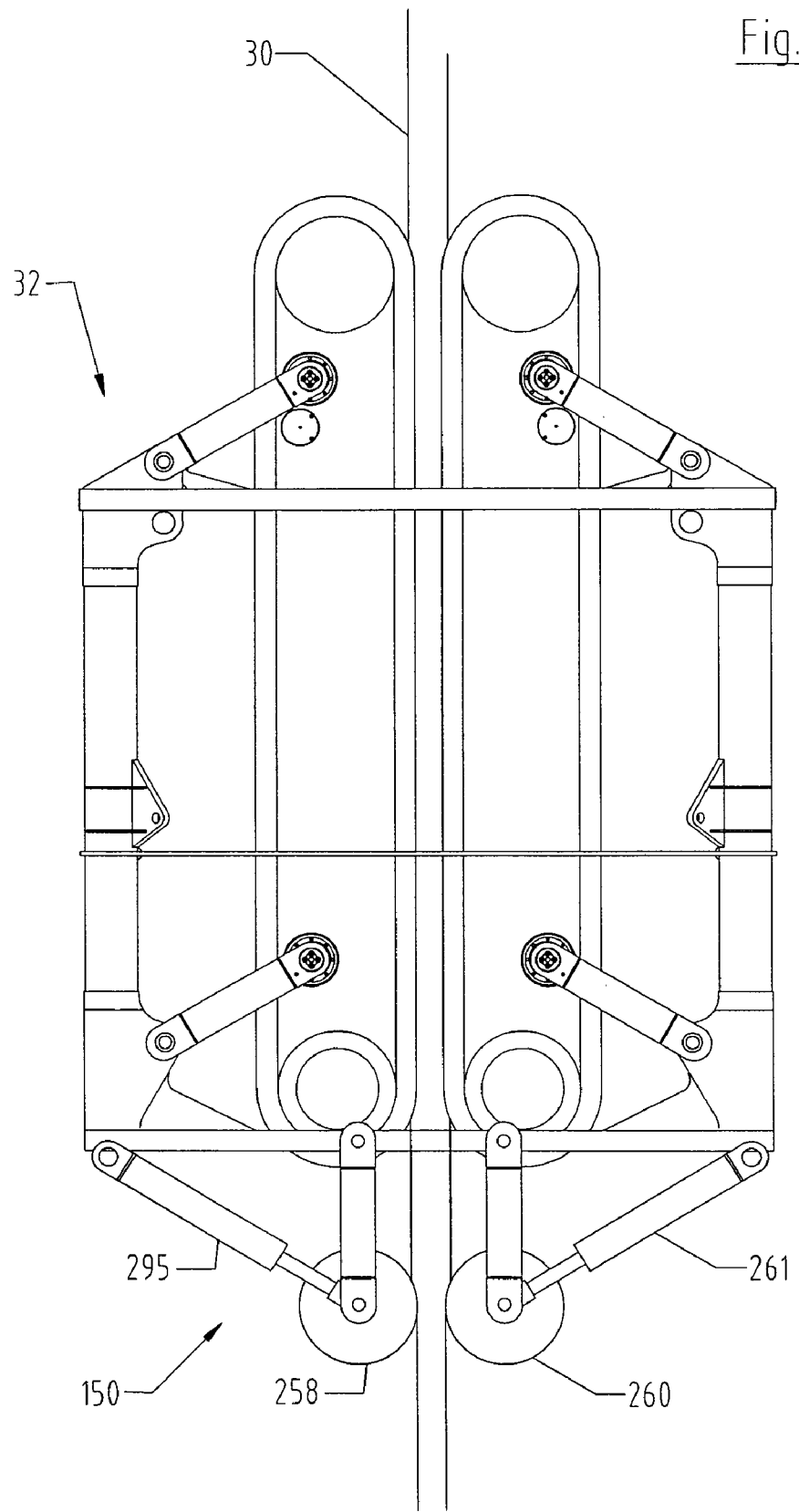
FIG. 11 is a detailed view of a braking device comprising of two rollers.
Figure 13:
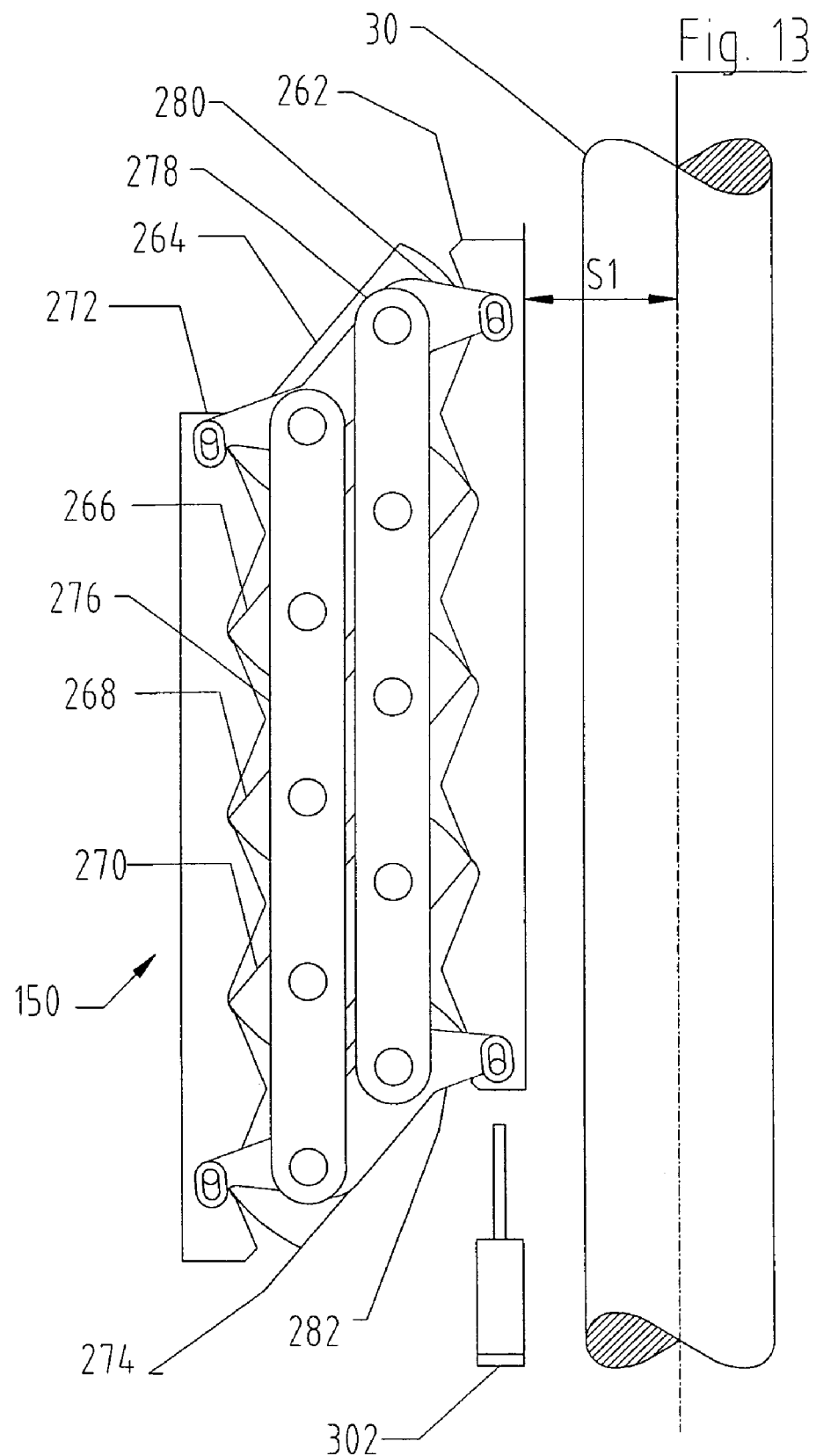
FIG. 13 is a side view of a third embodiment of a braking device in open position.
Figure 15:
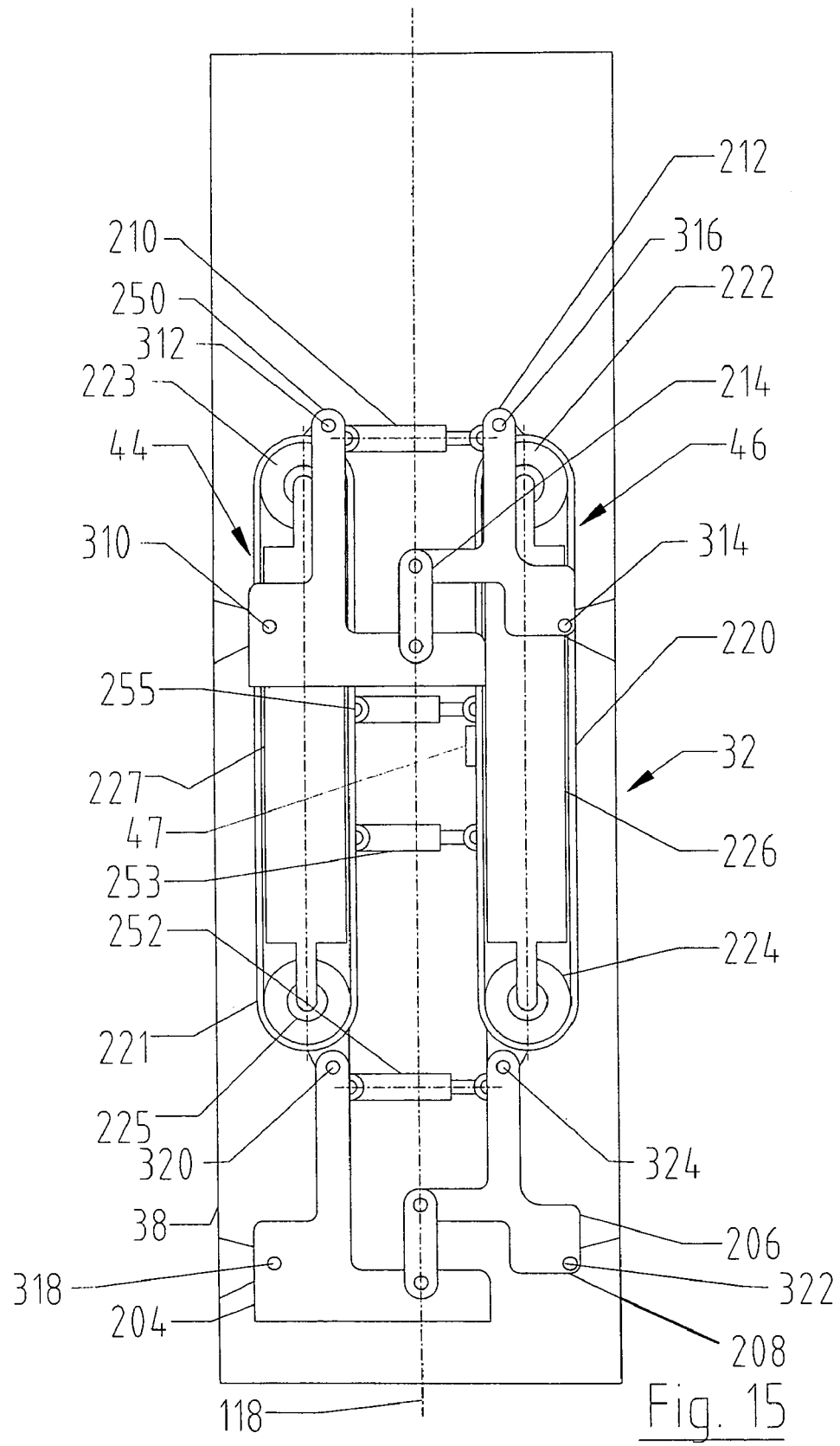
FIG. 15 is a cutaway view of a two-track body embodiment of a tensioner showing the running track alignment mechanism.

FIG. 11 is a detail of the first embodiment of the tubular braking device (150) of the tensioner (32) showing how the tubular (30) passes between two rollers (258) and (260), which are disposed on the braking device and can be moved by the first braking cylinder (295) and second braking cylinder (261). During braking tubular (30) is plastically deformed to a smaller diameter by the two rollers. FIG. 11 shows where the braking device (150) attaches. Braking device (150) comes in two versions. A plastic deforming device with rollers, as seen in FIG. 11, and a pair of braking shoes, as seen in FIG. 13 and FIG. 15. Braking device (150) can consist of only the rollers or only the braking shoes or both.

Figure 12:
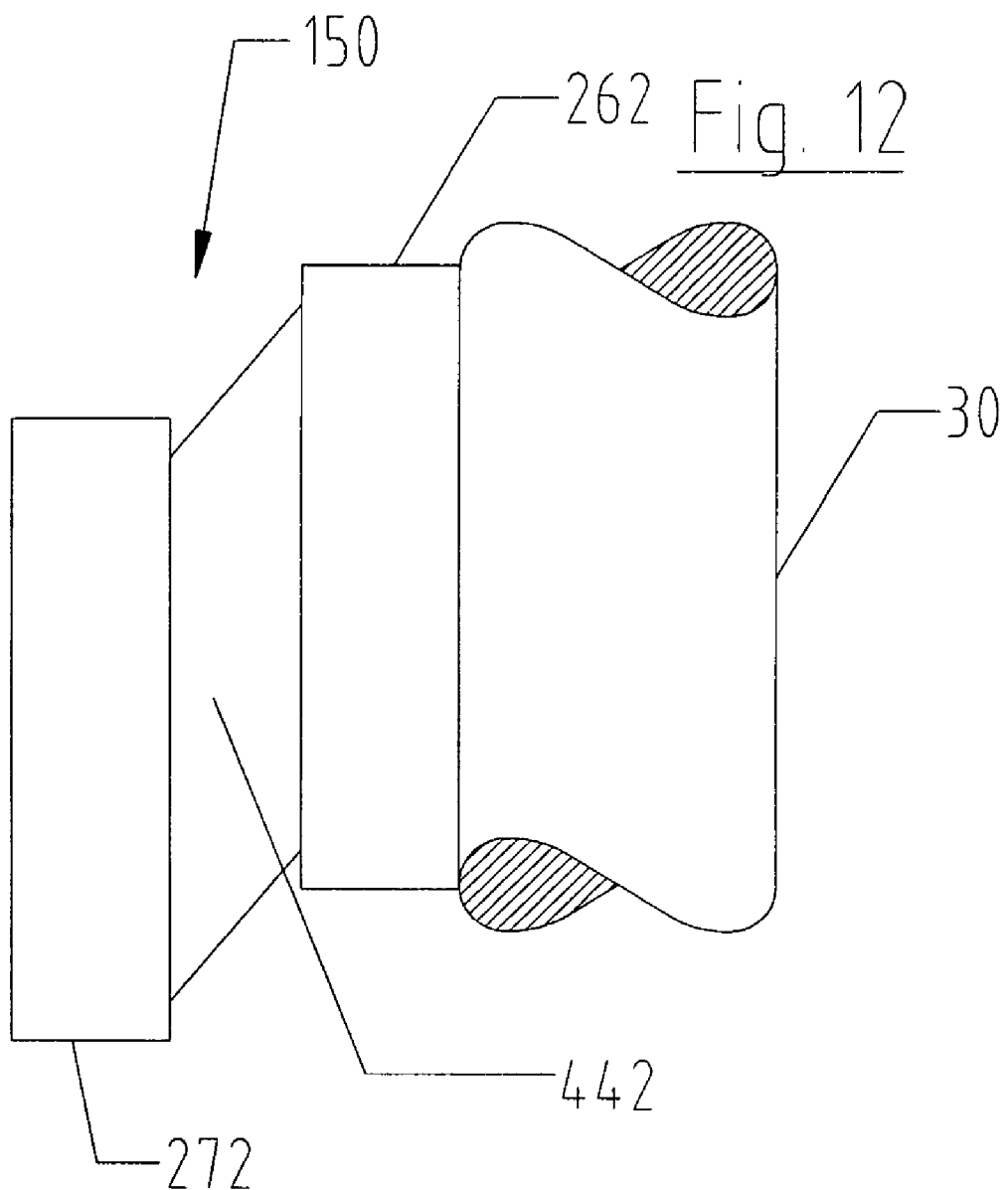
FIG. 12 is a second embodiment of a braking device in closed position.

FIG. 12 shows a second embodiment of the tubular braking device (150). The braking device has a braking pad (262) that engages tubular (30) and a brake housing (272) that is fixably connected to tensioner frame. Between the braking pad and the brake housing a flexible material (442) is located, which has a trapezium shape. Once engaged the braking pad will generate a braking force that increases with the weight of the pipe due to the geometrical construction. The flexible material (442) ensures that the braking force does not exceed certain limits to avoid damage to the pipe. The number of braking pads is minimal two in opposite orientation but can include any number up to (but not limiting to) 10.

Figure 14:
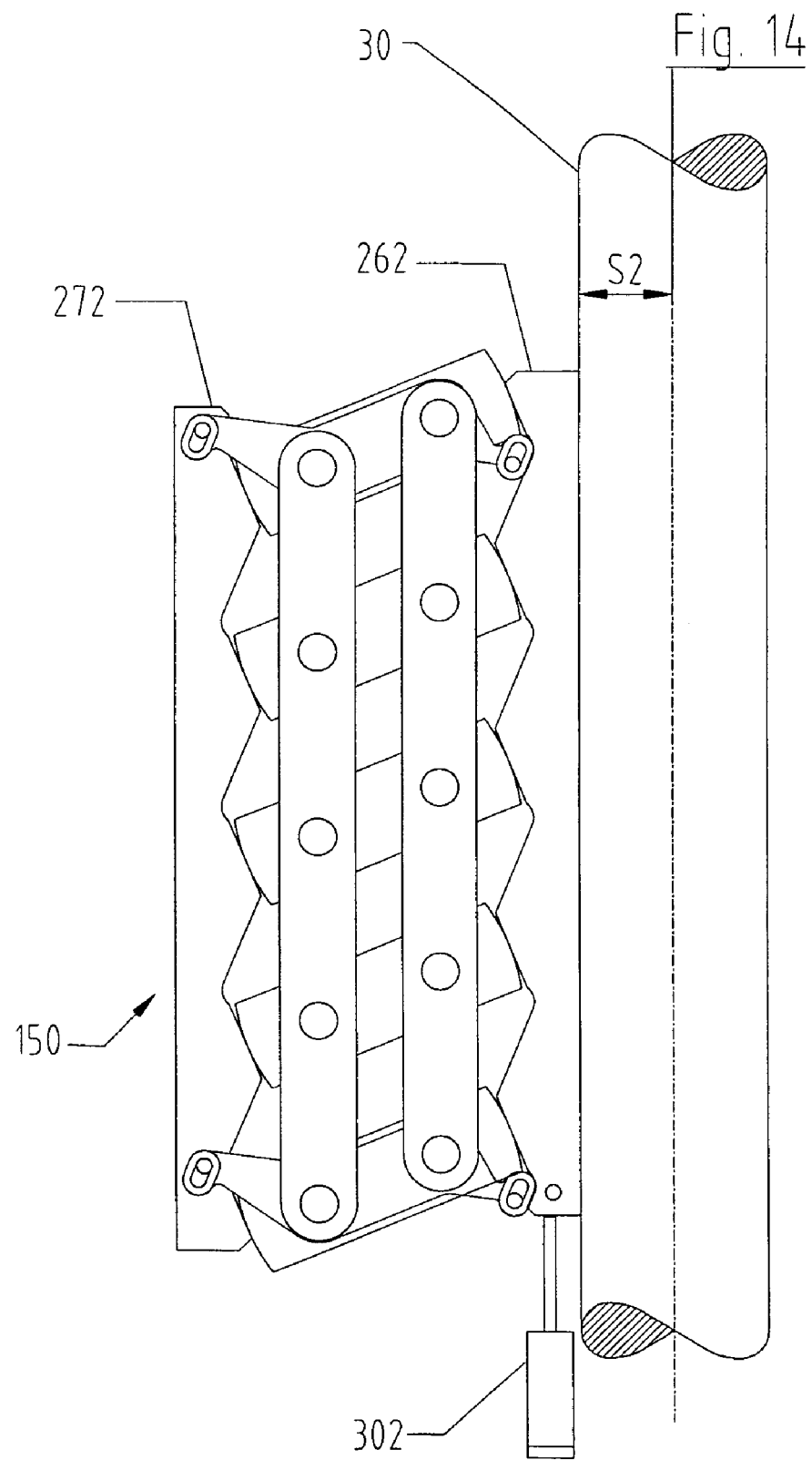
FIG. 14 is another view of a third embodiment of the braking device shown in FIG. 13 in closed position.

FIG. 13 shows a third embodiment of a braking device (150) for tubular (30). The braking device has a braking pad (262) that is supported in a spaced apart relation to braking housing (272) by connection beams (280) and (282). By moving down braking pad (262) the distance S1 will be decreased and the braking pad will engage tubular (30) as shown in FIG. 14. The horizontal forces on braking pad (262) can be very large, a number of spacing beams (264), (266), (268), (270) and (274) are located between braking pad (262) and braking housing (272) to transmit these forces to the braking housing. The spacing beams are being held in correct position by first connection strip (276) and second connection strip (278) to which they are movably connected. To prevent the holding force of becoming too large and damage the pipe the downward movement of braking pad (262) is limited by adjustable end stop (302). End stop (302) is connected to a hydraulic system to adjust the end stop (302) position.

FIG. 14 shows the tubular braking device (150), the braking housing (272) and adjustable end stop (302) in greater detail. FIG. 14 also shows how the distance S2 will decrease as a result of the downward motion of the braking pad (262).

FIG. 15 shows a side view of the tensioner (32) having a tensioner frame (38). The tubular vertical axis (118) is shown. The first track beam connection (204) and the second track beam connection (206) engage each other with a first connection beam (208). First track beam connection (204) engages an upper wheel (225) over which is disposed a tensioner running track (221). The second track beam connector (206) engages an upper wheel (224) over which a second tensioner running track (220). A hydraulic cylinder (252) can be used to keep the first track body and the second track body in a spaced apart relationship. Additional hydraulic cylinders (253) (255) and (250) can also be used to keep the bodies apart. In this preferred embodiment, the track bodies are movable with respect to the central axis, connected to each other with the connection beams such that a movement of one of the track bodies with respect to the central axis will enforce a corresponding movement of the other track bodies. In this way the track bodies will always engage the pipe in an optimal centralized position.

FIG. 15 continues y showing the first tensioner running track (221) also is disposed over a lower wheel (223) of the first track body (44) and the second tensioner running track (220) is disposed over a second lower wheel (222) of the second track body (46). The lower wheels are connected to third and fourth track connection beams (210 and 212), as the first and second wheel were connected to first and second track connection beams. The third and fourth track connection beams can be connected with a second connection beam (214). Additional first wheel connection beam (226) and second wheel connection beam (227) can be used in this embodiment as shown in the Figure. Track connection beams (226) and (227) have a discontinue cross section over the length of the beams making it possible to deform elastically at certain chosen locations. This enables the tensioner running track to follow any irregularities of the pipe without the necessity of increasing the clamping forces.

The position of the bearings of the connection beams (204), (208), (210) and (212) on the tensioner frame is such that during normal operation the weight of the pipe will cause the tensioner running tracks to move to the center of the tensioner thus increasing the clamping forces. This adds to the safety of the system and minimizes the energy consumption of the system. When the emergency brakes are applied the layout of the connection beams ensures that the tensioner running tracks automatically retract and disconnect of the pipe thus ensuring that damage to the tensioner running tracks is avoided. In this invention the connection beam bearings (310), (318), (322) and (314) are mounted on the tensioner housing and are located at a larger distance from the centerline compared to the connection beam bearings (312), (320), (324) and (316), they are oriented in such a way that downward movement will cause the tension running tracks to move inward. The difference in distance to the centerline of the bearings determines the relationship between the clamping force and the weight of the pipe.

FIG. 16 reveals a tubular (30) in cross section wherein the clamping shoes engage the tubular. In particular this FIG. 16 shows clamping shoe (347), (349), (351), (353), (355) and (357). Each braking shoe is contemplated to have at least one bearing (359), (361), (363), (365), (367) and (369).

While only a few embodiments of the invention have been disclosed in the above detailed description, the invention is not limited thereto but is susceptible to various changes without departing from the scope of the invention.

What is claimed is:

1. A tensioner removably mounted on a tower adapted to be inclined for handling tubulars and wherein the tensioner comprises:
   a. a first connector connected to the exterior of the tower adapted to be inclined;
   b. a second connector connected to the exterior of the tower adapted to be inclined;
   c. a tensioner frame disposed external to the tower adapted to be inclined, having a top portion and a bottom portion, wherein said first connector engages said top portion and said second connector engages said bottom portion;
   d. a first track body and a second track body disposed in the tensioner frame, said first and second track bodies in an opposing relationship with each other, and wherein the first track body engages the tensioner frame and the tubular, and the second track body engages the tensioner frame and the tubular; and
   e. an adjustable vertical support connected a rod which in turn is connected to the tensioner frame adapted to modify the relationship between the force transmitted by the adjustable vertical support onto the tensioner and motion of the tensioner frame relative to the tower.

2. The tensioner of claim 1, wherein the adjustable vertical support comprises: a housing wherein the housing has a first end connected to the mast and wherein in the housing slides a rod connected to the tensioner frame on one end, and a piston on the other end, the piston adjoins a chamber, and the chamber is in communication with an accumulator.

3. The tensioner of claim 1, wherein the adjustable vertical support comprises a mechanical spring.

4. The tensioner of claim 1, wherein the first connector and the second connector are hinges.

5. The tensioner of claim 2, wherein between 1 and 4 adjustable vertical supports are used.

6. The tensioner of claim 2, wherein the chamber is filled with a hydraulic fluid.

7. The tensioner of claim 2, wherein the piston is permitted to rest on the first end.

8. The tensioner of claim 2, wherein said top portion is a top side of the tensioner and the bottom portion is a bottom side of the tensioner.

9. The tensioner of claim 2, wherein the top portion is the topside closest to the tower and the bottom portion is the bottom side closest to the tower.

10. The tensioner of claim 2, wherein between 2 and 4 track bodies engage the tubular.

11. The tensioner of claim 2, wherein the track bodies and are movably connected to the tensioner frame by connection beams such that a movement of one of the track bodies with respect to the central axis will enforce a corresponding movement of other track bodies.

12. The tensioner of claim 1, further comprising a first clamping shoe and a second clamping shoe movably mounted on bearings that are fixably mounted on a running track.

13. The tensioner of claim 12, wherein the first clamping shoe and the second clamping shoe has with a double concave slot opening described by the radii R1 and R2.

14. The tensioner of claim 1, wherein the tensioner has a tensioner vertical axis and the tower has a tower vertical axis and the tensioner vertical axis is parallel to the tower vertical axis.

15. The tensioner of claim 1, wherein the tensioner further comprises a first motor connected to the first track body and a second motor connected to the second track body for driving respective track bodies.

16. The tensioner of claim 15, further comprising a controller connected to the first motor and a second motor for controlling both motors.

17. The tensioner of claim 1, further comprising a tubular braking device mounted on the mast for engaging the tubular.

* * * * *